(12) United States Patent
Xin et al.

(10) Patent No.: US 9,875,386 B2
(45) Date of Patent: Jan. 23, 2018

(54) SYSTEM AND METHOD FOR RANDOMIZED POINT SET GEOMETRY VERIFICATION FOR IMAGE IDENTIFICATION

(71) Applicant: FutureWei Technologies, Inc., Plano, TX (US)

(72) Inventors: Xin Xin, Chicago, IL (US); Zhu Li, Palatine, IL (US); Aggelos K. Katsaggelos, Chicago, IL (US)

(73) Assignee: Futurewei Technologies, Inc., Plano, TX (US)

( * ) Notice: Subject to any disclaimer, the term of this patent is extended or adjusted under 35 U.S.C. 154(b) by 204 days.

(21) Appl. No.: 13/677,003

(22) Filed: Nov. 14, 2012

(65) Prior Publication Data
US 2013/0121598 A1 May 16, 2013

Related U.S. Application Data

(60) Provisional application No. 61/560,078, filed on Nov. 15, 2011.

(51) Int. Cl.
*G06K 9/46* (2006.01)
*G06K 9/00* (2006.01)
*G06K 9/62* (2006.01)

(52) U.S. Cl.
CPC .............. *G06K 9/00* (2013.01); *G06K 9/6211* (2013.01)

(58) Field of Classification Search
None
See application file for complete search history.

(56) References Cited

U.S. PATENT DOCUMENTS

| | | | |
|---|---|---|---|
| 6,073,258 A | 6/2000 | Wheater | |
| 6,580,821 B1* | 6/2003 | Roy | 382/154 |
| 6,591,011 B1* | 7/2003 | Nielsen | 382/218 |
| 7,194,483 B1 | 3/2007 | Mohan et al. | |
| 7,606,819 B2 | 10/2009 | Audet et al. | |
| 7,622,182 B2 | 11/2009 | Wang et al. | |

(Continued)

FOREIGN PATENT DOCUMENTS

| CN | 1710608 A | 12/2005 |
|---|---|---|
| CN | 101859326 A | 10/2010 |

(Continued)

OTHER PUBLICATIONS

Shapiro (Linda Shapiro, Computer Vision, 2000).*

(Continued)

*Primary Examiner* — Mark Roz
(74) *Attorney, Agent, or Firm* — Slater Matsil, LLP

(57) ABSTRACT

Object recognition can be improved by verifying a geometric consistency between matching interesting points pairs of two images, as objects with the images are more likely to match when the matching interesting points pairs are geometrically consistent. The geometric consistency between matching interesting points pairs can be verified in accordance with a topology code distance vector (D). The topology code distance vector (D) may be evaluated in accordance with a decision tree classifier, which may be trained in accordance with previous or historic topology code distance vectors. The topology code distance vector (D) may be computed from a subset of matching interesting points pairs having the shortest matching distance.

14 Claims, 4 Drawing Sheets

(56) References Cited

U.S. PATENT DOCUMENTS

| | | |
|---|---|---|
| 8,380,647 B2 | 2/2013 | Perronnin et al. |
| 2005/0047661 A1* | 3/2005 | Maurer .................. 382/190 |
| 2013/0016912 A1* | 1/2013 | Li et al. .................. 382/197 |

FOREIGN PATENT DOCUMENTS

| | | |
|---|---|---|
| EP | 2172875 A1 | 4/2010 |
| KR | 20100104581 A1 | 9/2010 |

OTHER PUBLICATIONS

Stefan Pochmann, from http://www.stefan-pochmann.info/spots/tutorials/basic_programming/, dated 2002.*

Chandrasekaran, "Lower Bounds" from https://www.utdallas.edu/—chandra/documents/6363/lbd.pdf, earliest date available 2003 confirmed on Web Archive.*

Wikipedia, Decision Tree Learning, earliest date available 2004.*

Normand Gregoire, Hausdorff distance between convex plygons, McGill University 1998.*

Linda Shapiro, Computer Vision, Elsevier 2001.*

Xiaofei, H., et al., "Face Recognition Using Laplacianfaces", IEEE Transactions on Pattern Analysis and Machine Intelligence, 2005, pp. 1-13, vol. 27, No. 3.

Ding, C., et al.,"Linearized Cluster Assignment via Spectral Ordering," Proceedings of the 21st International Conference on Machine Learning, 2004, 8 pages.

"International Search Report," International Application No. PCT/CN2012/070013, dated Apr. 19, 2012, 3 pages.

Lowe, D., et al., "Object Recognition from Local Scale-Invariant Features", Computer Vision, The Proceedings of the Seventh IEEE International Conference, 1999, pp. 1150-1157, vol. 2.

Reznik, Y.A., "On MPEG Work Towards a Standard for Visual Search," MPEG-7 CDVS, 8th FP7 Networked Media Concentration meeting, Dec. 13, 2011, 23 pages.

Lowe, D.G. , "Object Recognition from Local Scale-Invariant Features," International Conference on Computer Vision, Greece, Sep. 1999, pp. 1150-1157.

Bay, H. et al., "Surf: Speeded Up Robust Features," Computer Vision-ECCV, Springer Berlin Heidelberg, 2006, pp.

* cited by examiner

SYSTEM AND METHOD FOR RANDOMIZED POINT SET GEOMETRY VERIFICATION FOR IMAGE IDENTIFICATION

This application claims the benefit of U.S. Provisional Application No. 61/560,078 filed on Nov. 15, 2011, entitled "System and Method for Randomized Point Set Geometry Verification for Image Identification," which is incorporated herein by reference as if reproduced in its entirety.

TECHNICAL FIELD

The present invention relates to a system and method for video signal processing, and, in particular embodiments, to a system and method for randomized point set geometry verification for image identification.

BACKGROUND

Various signal processing techniques have been proposed under the Video Quality Experts Group (VQEG) standards body, many of which are computationally expensive and have associated communication costs that can restrict or prohibit broadcasting and multicasting. Accordingly, many of these proposals are incapable of supporting real time operation, and therefor may be unsuitable for content delivery network (CDN) applications. As such, lower complexity signal processing techniques for use in CDN and other applications is desired.

SUMMARY

Technical advantages are generally achieved, by embodiments of this disclosure which describe a system and method for randomized point set geometry verification for image identification.

In accordance with an embodiment, a method for image identification is provided. In this example, the method includes identifying matching interesting points pairs between a first image and a second image, determining a geometric consistency of the matching interesting points pairs, and determining whether the first image matches the second image in accordance with the geometric consistency of the matching interesting points pairs. An apparatus for performing this method is also provided.

In accordance with yet another embodiment, a method for image identification is provided. In this example, the method includes computing a first interesting points set ($S_1 = \{s_1^1, s_1^2, \ldots,\}$) for a first image and a second interesting points set ($S_2 = \{s_2^1, s_2^2, \ldots,\}$) for a second image, and determining matching interesting points pairs between the second interesting points set ($S_2 = \{s_2^1, s_2^2, \ldots,\}$) and the second interesting points set ($S_2 = \{s_2^1, s_2^2, \ldots,\}$). The method further includes sorting the matching interesting points pairs by matching distance, selecting a subset of matching interesting points pairs having the shortest matching distance, determining a topology code distance vector (D) for the subset of matching interesting points pairs, and determining whether the first image and second image match using the topology code distance vector (D) in accordance with a decision tree classifier.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
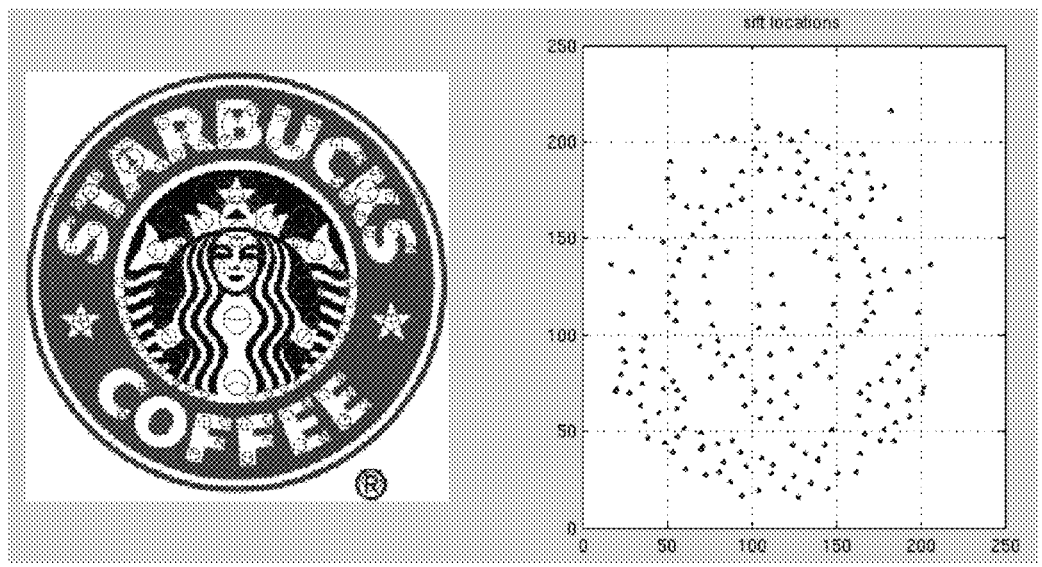
FIG. 1 illustrates a representative interesting points topology.

The making and using of the presently disclosed embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Modern-era mobile phones, handsets, tablets, mobile terminals, mobile devices, or user equipments have evolved into powerful image- and video-processing devices, equipped with high-resolution cameras, color displays, and hardware-accelerated graphics. With the explosive growth of mobile devices, like android, iPhone, mobile based multimedia visual services are enjoying intense innovation and development. Application scenarios of mobile visual search services can be location based services, logo search, and so on, where one image or multimedia sent from a mobile device is matched to another one stored in a database or an image repository.

For any object in an image/frame, a collection of interesting points (e.g., scale and rotational interesting points) can be extracted to provide a "feature description" of the object. This feature description is then used to identify the object in other images/frames using one of a variety of algorithms. One such algorithm may be scale-invariant feature transform (SIFT) as described in the journal article "Object Recognition from Local Scale-Invariant Features" Institute for Electrical and Electronics Engineers (IEEE) International Conference on Computer Vision (ICCV), September 1999, pp. 1150-1157, which is incorporated by reference herein as if reproduced in its entirety. As another example, Speeded Up Robust Feature (SURF) is an object recognition algorithm described in the journal article "SURF: Speeded Up Robust Features," Computer Vision and Image Understanding (CVIU), Vol. 110, No. 3, pp. 346-359 (2008), which is incorporated by reference herein as if reproduced in its entirety.

Visual object recognition algorithms (SIFT, SURF, etc.) attempt to track a given object by matching the set of interesting points extracted from the reference image/frame to corresponding sets of interesting points in the other frames/images. In practical applications, the matching interesting points can be impeded by noise and mistakes in the images. More specifically, skewing and imperfections in the images may result in erroneous matching of interesting points, which may completely upset/disrupt object identification. Hence, techniques for improving the accuracy of matching algorithms during visual object recognition are desired.

Aspects of this disclosure increase the accuracy of visual object recognition by verifying the geometric consistency of matching interesting points pairs. In one example, a randomized point set geometry consistence matching scheme is provided to promote visual search accuracy and provide randomized point set geometry verification for robust image identification. Embodiments may generally improve robustness and accuracy by counting not only the number of matching pairs, but also the matching pair points' geometric consistency to achieve robust visual identification in large image repositories. Embodiments may be applied to visual content management, MediaWorks, cloud based media storage and search services, advertisements, and other content services.

IFT, SURF, and GLOH, a simple threshold on the number of interesting points matched does not fully exploit the discriminating power of the interesting points geometrical layout. One challenge in utilizing geometry matching is to account for the noise in the matching interesting points pairs. An embodiment includes a decision tree-based randomized point set topology verification scheme, with performance gains in retrieval accuracy. Embodiments may be applied to and/or incorporated into, for example, the MPEG-7 Compact Descriptor for Visual Search (CDVS) standard.

Figure 2:
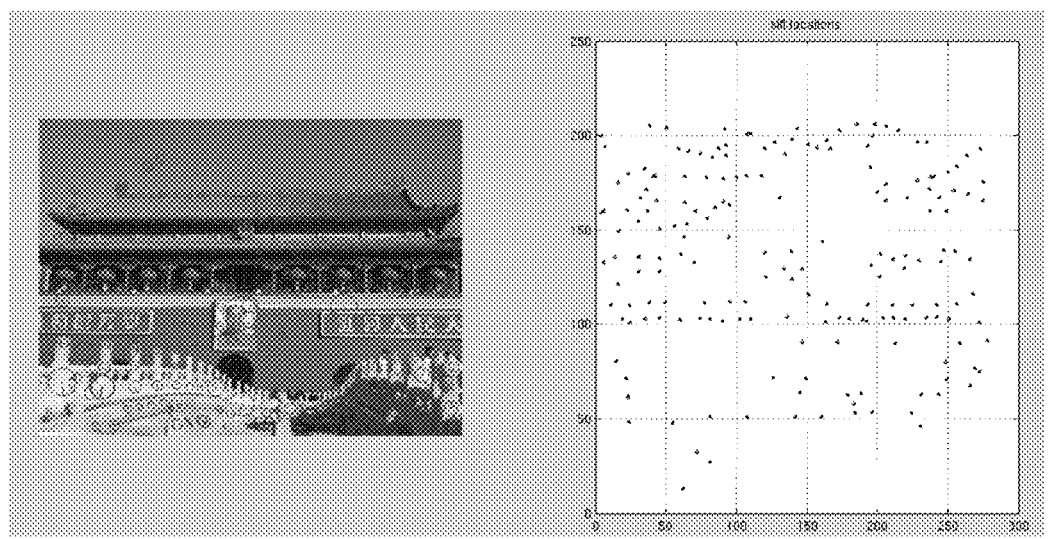
FIG. 2 illustrates another representative interesting points topology.

A visual object and Point of Interest (POI) may be represented as a collection of scale and rotation invariant features. In visual object identification, objects are represented as a collection of scale and rotation invariant interesting points like SIFT [1] and SURF [2], and others. Examples are shown in FIGS. 1 and 2, with the feature point topologies shown to the right of the associated images.

Figure 3:
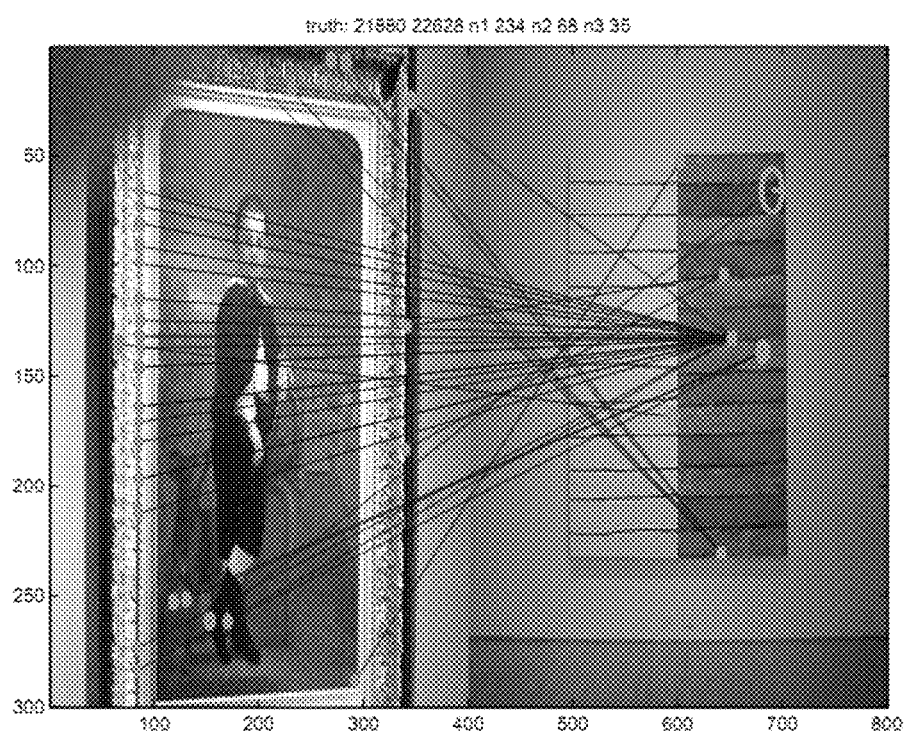
FIG. 3 illustrates non-matching pairs without geometric consistency.
Figure 4:
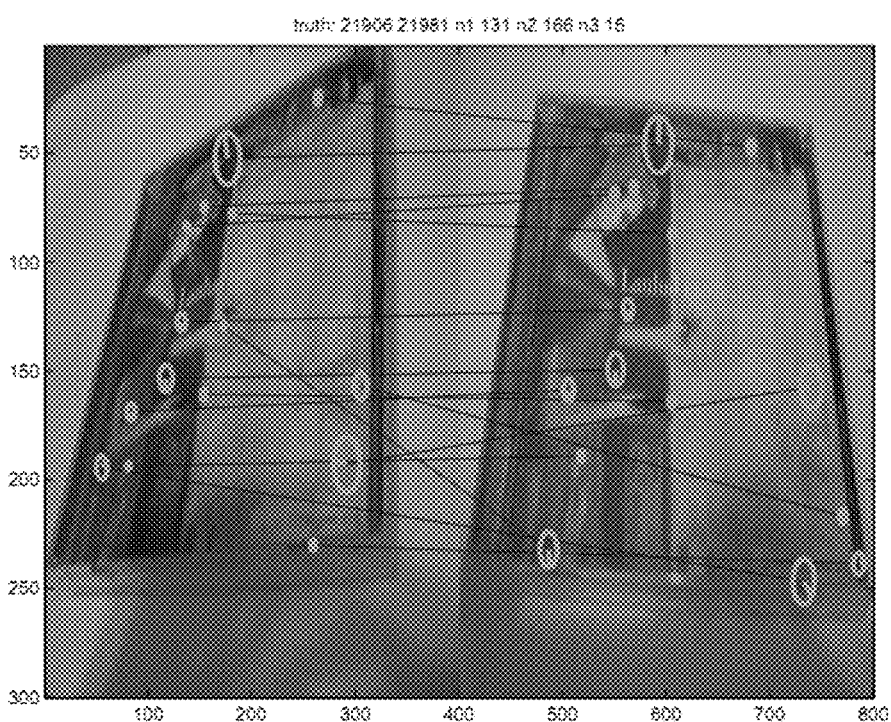
FIG. 4 illustrates matching pairs with geometric consistency.
Figure 5:
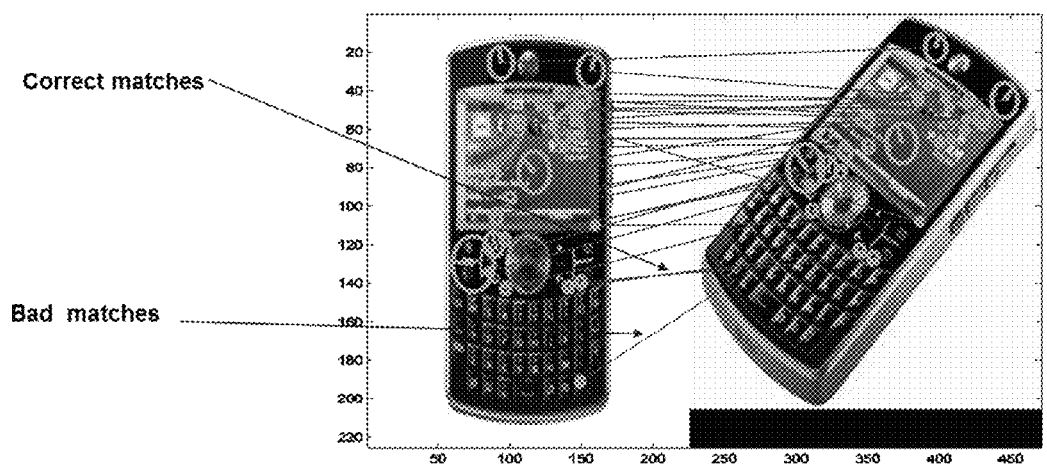
FIG. 5 illustrates noisy matching pairs with geometric consistency.

Visual object and POI identification is performed by searching for and matching these features. In an embodiment, visual object identification is performed by verifying interesting points geometry. Comparing different types of images, FIG. 3 illustrates non-matching image pairs that lack geometric consistency. FIGS. 4 and 5 illustrate matching pairs having geometric consistency. FIG. 4 illustrates matching image pairs having consistency, and FIG. 5 illustrates noisy matching pairs. In counting matching pairs between two images, verification should be performed to determine that they are true matches. Setting stringent distance threshold on interesting points alone is not effective. Verification on geometrical consistency also is performed.

An embodiment method for image identification comprises determining interesting points sets for two images as $S_1=\{s_1^1, s_1^2, \ldots,\}$, and $S_2=\{s_2^1, s_2^2, \ldots,\}$ in $R^p$, where p is the feature space dimension, and associated image coordinates as $P_1$ and $P_2$ in $R^2$, determining matching interesting points pairs as $\{<j,k>|d(s_1^j, s_2^k) \le d_0\}$, determining, for top n matching pairs sorted by matching distance, $$h = \binom{n}{m}$$

subsets of matching pairs, determining an h-dimension topology code distance vector D in $R^h$, and training a decision tree classifier on D configured to output match or non-match results.

An embodiment computer program product for image identification has a non-transitory computer-readable medium with a computer program embodied thereon. The computer program comprises computer program code for determining interesting points sets for two images as $S_1=\{s_1^1, s_1^2, \ldots,\}$, and $S_2=\{s_2^1, s_2^2, \ldots,\}$ in $R^p$, where p is the feature space dimension, and associated image coordinates as $P_1$ and $P_2$ in $R^2$, computer program code for determining matching interesting points pairs as $\{<j,k>|d(s_1^j, s_2^k) \le d_0\}$, computer program code for determining, for top n matching pairs sorted by matching distance, $$h = \binom{n}{m}$$

subsets of matching pairs, computer program code for determining an h-dimension topology code distance vector D in $R^h$, and computer program code for training a decision tree classifier on D configured to output match or non-match results.

In an embodiment, at the time of identification, for the matching visual objects from two images, interesting points will be recaptured and matched correctly, as illustrated in FIG. 2. For image pairs with non-matching pairs, such as those shown in FIG. 1, even though some interesting points will be matched up by chance, as they may have image patches that do have the same interesting points features, the geometry of those matched feature points is not consistent. Various embodiments provide algorithms that capture this consistency or inconsistency for identification purposes. The basic metric is described in the provisional patent application on topological coding [3], where two point sets' geometrical consistency is computed as a distance between their graph Laplacian eigenvalue difference.

In practical applications, however, even the matching between interesting points consists of a significant amount of noise and mistakes, as illustrated in FIG. 5. A pair of erroneously matching interesting points will deteriorate or invalidate object identification. To overcome this problem, an embodiment includes the following randomized verification, or randomized point set geometry consistency matching scheme.

First, compute the interesting points sets for two images as $S_1=\{s_1^1, s_1^2, \ldots,\}$, and $S_2=\{s_2^1, s_2^2, \ldots,\}$ in $R^p$, where p is the feature space dimension, and their image coordinates as $P_1$ and $P_2$ in $R^2$.

Second, compute the matching interesting points pairs in accordance with the following formula: $\{<j,k>|d(s_1^j, s_2^k) \le d_0\}$.

Third, for the top n matching pairs sorted by their matching distance, compute the $$h = \binom{n}{m}$$

subsets of matching pairs, and compute their h-dimension topology code distance vector D in $R^h$.

Fourth, train a decision tree classifier on D that will output match or non-match results.

The randomized verification generally compensates for noisy matches, and utilizes the Laplacian eigenvalue descriptor discloses in provisional patent application [3]. Decision tree classification is based on sorted Laplacian code distance. An embodiment enables robust visual query by capture, and auto visual keyword tagging applications.

Figure 6:
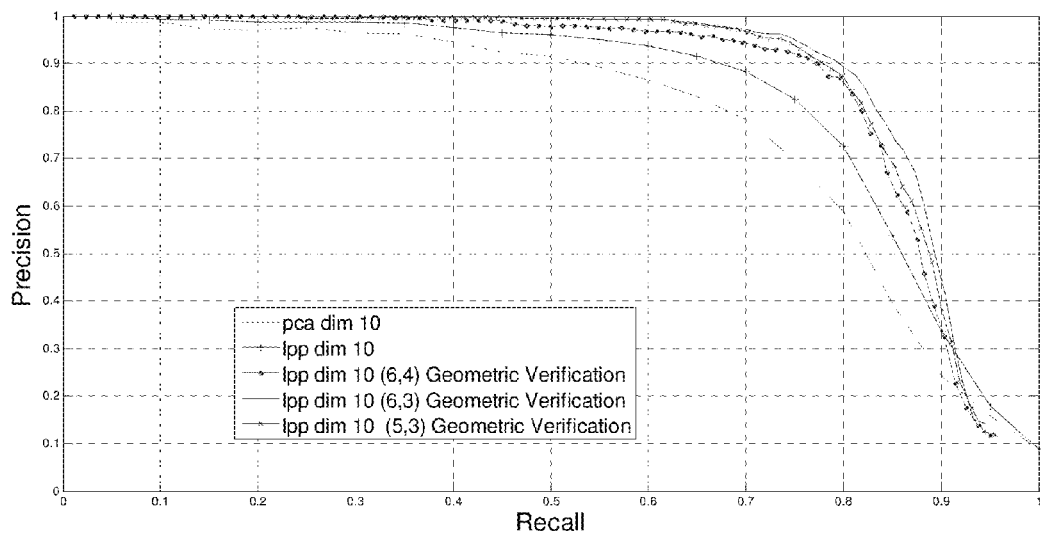
FIG. 6 illustrates a graph comparison of different techniques.

In one embodiment, n=6, m=4 in randomized verification is selected, and the classifier takes input on sorted distance vector in $R^6$. In simulation, the algorithm was tested with an MPEG-7 CDVS data set that has approximately 40,000+ images and ground truth for 200,000+ matching and non-matching pairs. The improvement on the identification accuracy is illustrated in the FIG. 6, which shows comparisons between SIFT, SURF, and randomized point set geometric verification with different values for n and m.

Figure 7:
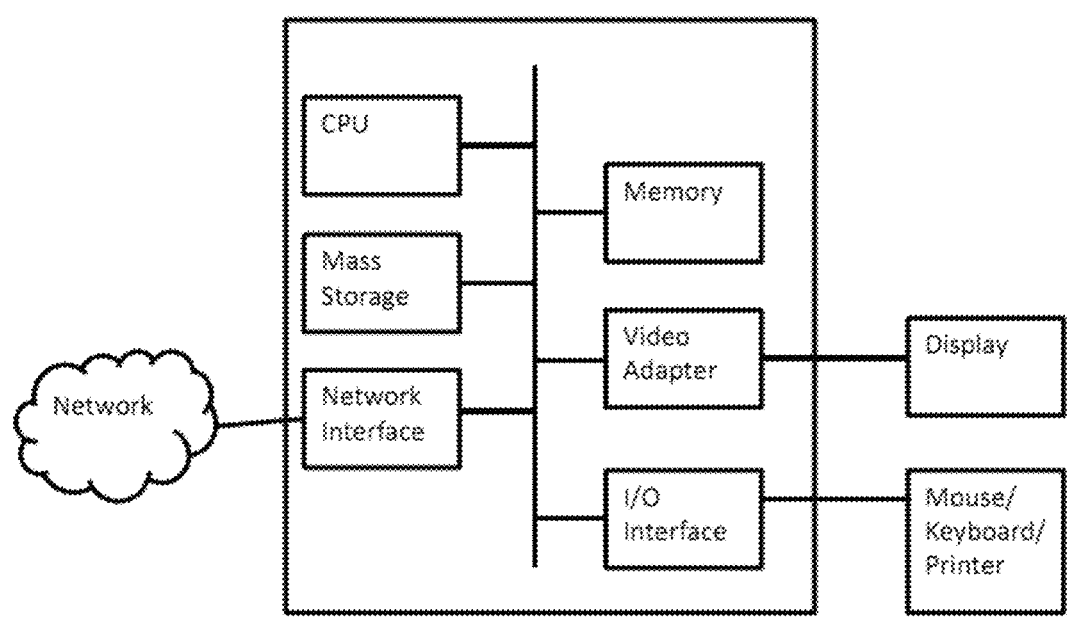
FIG. 7 is a block diagram illustrating a computing platform that may be used for implementing, for example, the devices and methods described herein, in accordance with an embodiment.

FIG. 7 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety: [1] David G. Lowe: Object Recognition from Local Scale-Invariant Features. ICCV 1999: 1150-1157; [2] Herbert Bay, Andreas Ess, Tinne Tuytelaars, Luc Van Gool "SURF: Speeded Up Robust Features," Computer Vision and Image Understanding (CVIU), Vol. 110, No. 3, pp. 346-359, 2008; and [3] Zhu Li, Xin Xin, and Aggelos Katsaggelos, "Topological Coding and Verification with Spectral Analysis," U.S. Provisional Patent Application Ser. No. 61/506,612, filed on Jul. 11, 2011.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for image identification, the method comprising:
    identifying matching interesting points pairs between a first image and a second image, the matching interesting pairs matching a first set of points in the first image to a second set of points in the second image, wherein each point in the first set of points is exclusively mapped to a corresponding point in the second set of points such that each matched point in the first image is paired with a single matched point in the second image;
    evaluating a geometric consistency between the matching interesting points pairs, each of the matching interesting points pairs including an interesting point in the first image and a corresponding interesting point in the second image, the second image being different than the first image, wherein evaluating a geometric consistency between the matching interesting points pairs comprises sorting the matching interesting points pairs by matching distance, identifying a subset of the matching interesting points pairs having the shortest matching distance, and determining how geometrically consistent the subset of matching interesting points pairs are with one another in accordance with a distance vector (D) for the subset of matching interesting points pairs, wherein the distance vector (D) indicates distances between pairs of matching interesting points in the subset of matching interesting points; and
    determining whether an object in the first image matches a corresponding object in the second image in accordance with the geometric consistency between the matching interesting points pairs wherein the matching distance is computed as a Laplacian eigenvalue distance.

2. The method of claim 1, wherein determining the subset of the matching interesting points pairs having the shortest matching distance comprises:
    computing the distance vector (D) for the subset of matching interesting points pairs.

3. The method of claim 2, wherein determining whether an object in the first image matches a corresponding object in the second image comprises:
    analyzing the distance vector (D) in accordance with a decision tree classifier.

4. The method of claim 3, wherein the decision tree classifier is trained in accordance with previous distance vectors.

5. The method of claim 1, wherein identifying matching interesting points pairs between the first image and the second image comprises:
  computing a first interesting points set ($S_1=\{s_1^1, s_1^2, \ldots,\}$) for the first image and a second interesting points set ($S_2=\{s_2^1, s_2^2, \ldots,\}$) for the second image; and
  identifying the matching interesting points pairs by identifying interesting points within the first interesting points set ($S_1=\{s_1^1, s_1^2, \ldots,\}$) that match interesting points within the second interesting points set ($S_2=\{s_2^1, s_2^2, \ldots,\}$).

6. The method of claim 1, wherein identifying matching interesting points pairs between the first image and the second image comprises:
  computing a first interesting points set ($S_1=\{s_1^1, s_1^2, \ldots,\}$) for the first image and a second interesting points set ($S_2=\{s_2^1, s_2^2, \ldots,\}$) for the second image; and
  identifying the candidate matching interesting points pairs by comparing the first interesting points set ($S_1=\{s_1^1, s_1^2, \ldots,\}$) with the second interesting points set ($S_2=\{s_2^1, s_2^2, \ldots,\}$).

7. The method of claim 1, wherein identifying the matching interesting points pairs comprises:
  computing a first interesting points set ($S_1=\{s_1^1, s_1^2, \ldots,\}$) for the first image and a second interesting points set ($S_2=\{s_2^1, s_2^2, \ldots,\}$) for the second image; and
  computing the matching interesting points pairs in accordance with the following formula: $\{<j,k>|d(s_1^j, s_2^k) \le d_0\}$, where $d(s_1^j, s_2^k)$ is a distance between a $j^{th}$ interesting point in the first interesting points set ($S_1=\{s_1^1, s_1^2, \ldots,\}$) and a $k^{th}$ in the second interesting points set ($S_2=\{s_2^1, s_2^2, \ldots,\}$), and $d_0$ is a distance threshold.

8. An apparatus comprising:
  a processor; and
  a computer readable storage medium storing programming for execution by the processor, the programming including instructions to:
  identify matching interesting points pairs between a first image and a second image, the matching interesting pairs matching a first set of points in the first image to a second set of points in the second image, wherein each point in the first set of points is exclusively mapped to a corresponding point in the second set of points such that each matched point in the first image is paired with a single matched point in the second image;
  evaluate a geometric consistency between the matching interesting points pairs, each of the matching interesting points pairs including an interesting point in the first image and a corresponding interesting point in the second image, the second image being different than the first image, wherein the instructions to evaluate a geometric consistency between the matching interesting points pairs includes instructions to sort the matching interesting points pairs by matching distance, identify a subset of the matching interesting points pairs having the shortest matching distance, and determine how geometrically consistent the subset of matching interesting points pairs are with one another in accordance with a distance vector (D) for the subset of matching interesting points pairs, wherein the distance vector (D) indicates distances between pairs of matching interesting points in the subset of matching interesting points; and
  determine whether an object in the first image matches a corresponding object in the second image in accordance with the geometric consistency between the matching interesting points pairs wherein the matching distance is computed as a Laplacian eigenvalue distance.

9. The apparatus of claim 8, wherein the instruction to determine the subset of the matching interesting points pairs having the shortest matching distance includes instructions to:
  compute the distance vector (D) for the subset of matching interesting points pairs.

10. The apparatus of claim 9, wherein the instruction to determine whether an object in the first image matches a corresponding object in the second image includes instructions to:
  analyzing the distance vector (D) in accordance with a decision tree classifier.

11. The apparatus of claim 10, wherein the decision tree classifier is trained in accordance with previous distance vectors.

12. The apparatus of claim 8, wherein the instruction to identify matching interesting points pairs between the first image and the second image includes instructions to:
  compute a first interesting points set ($S_1=\{s_1^1, s_1^2, \ldots,\}$) for the first image and a second interesting points set ($S_2=\{s_2^1, s_2^2, \ldots,\}$) for the second image; and
  identify the matching interesting points pairs by identifying interesting points within the first interesting points set ($S_1=\{s_1^1, s_1^2, \ldots,\}$) that match interesting points within the second interesting points set ($S_2=\{s_2^1, s_2^2, \ldots,\}$).

13. The apparatus of claim 8, wherein the instruction to identify matching interesting points pairs between the first image and the second image includes instructions to:
  compute a first interesting points set ($S_1=\{s_1^1, s_1^2, \ldots,\}$) for the first image and a second interesting points set ($S_2=\{s_2^1, s_2^2, \ldots,\}$) for the second image; and
  identify the candidate matching interesting points pairs by comparing the first interesting points set ($S_1=\{s_1^1, s_1^2, \ldots,\}$) with the second interesting points set ($S_2=\{s_2^1, s_2^2, \ldots,\}$).

14. The apparatus of claim 8, wherein the instruction to identify the matching interesting points pairs includes instructions to:
  compute a first interesting points set ($S_1=\{s_1^1, s_1^2, \ldots,\}$) for the first image and a second interesting points set ($S_2=\{s_2^1, s_2^2, \ldots,\}$) for the second image; and
  compute the matching interesting points pairs in accordance with the following formula: $\{<j,k>|d(s_1^j, s_2^k) \le d_0\}$, where $d(s_1^j, s_2^k)$ is a distance between a $j^{th}$ interesting point in the first interesting points set ($S_1=\{s_1^1, s_1^2, \ldots,\}$) and a $k^{th}$ in the second interesting points set ($S_2=\{s_2^1, s_2^2, \ldots,\}$), and $d_0$ is a distance threshold.

* * * * *